(12) United States Patent  
Iwasaki et al.

(10) Patent No.: US 8,838,024 B2  
(45) Date of Patent: Sep. 16, 2014

(54) NEAR FIELD COMMUNICATION APPARATUS, DISPLAY CONTROL METHOD, AND PROGRAM

(75) Inventors: Jun Iwasaki, Tokyo (JP); Takashi Fukuda, Kanagawa (JP); Natsumi Kaneko, Tokyo (JP); Yasutaka Kotani, Tokyo (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 13/358,045

(22) Filed: Jan. 25, 2012

(65) Prior Publication Data

US 2012/0208458 A1    Aug. 16, 2012

(30) Foreign Application Priority Data

Feb. 10, 2011    (JP) .................................. 2011-027290

(51) Int. Cl.
*H04B 5/00*    (2006.01)
*H04B 17/00*    (2006.01)

(52) U.S. Cl.
CPC ........ *H04B 17/0057* (2013.01); *H04B 17/0065* (2013.01); *H04B 5/00* (2013.01)
USPC ...................................................... 455/41.1

(58) Field of Classification Search
USPC .............................................. 455/41.1, 41.2
See application file for complete search history.

(56) References Cited

U.S. PATENT DOCUMENTS

| | | |
|---|---|---|
| 2006/0160488 A1 | 7/2006 | Sueoka et al. |
| 2008/0093447 A1* | 4/2008 | Johnson et al. ................ 235/383 |
| 2008/0194298 A1 | 8/2008 | Panabaker et al. |
| 2010/0004031 A1 | 1/2010 | Kim |
| 2010/0190537 A1 | 7/2010 | Fujii |
| 2010/0227558 A1 | 9/2010 | Sueoka et al. |
| 2011/0212688 A1* | 9/2011 | Griffin et al. ................ 455/41.1 |
| 2012/0038781 A1* | 2/2012 | Im et al. .................... 348/207.1 |
| 2012/0040609 A1* | 2/2012 | Griffin et al. ................ 455/41.1 |
| 2012/0050004 A1* | 3/2012 | Curtis et al. .................... 340/5.2 |
| 2012/0057508 A1* | 3/2012 | Moshfeghi .................... 370/277 |
| 2012/0214414 A1* | 8/2012 | Abel et al. .................... 455/41.1 |
| 2013/0101005 A1* | 4/2013 | Aryanfar ....................... 375/224 |

FOREIGN PATENT DOCUMENTS

| | | |
|---|---|---|
| EP | 1 681 779 A2 | 7/2006 |
| EP | 2 144 425 A2 | 1/2010 |
| JP | 2009-303157 | 12/2009 |

OTHER PUBLICATIONS

Extended European Search Report issued Jul. 3, 2012, in European Patent Application No. 12153059.6.

* cited by examiner

*Primary Examiner* — Creighton Smith
(74) *Attorney, Agent, or Firm* — Oblon, Spivak, McClelland, Maier & Neustadt, L.L.P.

(57) ABSTRACT

An information processing apparatus including a housing having a first surface and a second surface; a display disposed on the first surface of the housing; a near-field communication interface disposed at a first position on or beneath the second surface; and a processor configured to control the display to display a graphic indication corresponding to the near-field communication interface at a second position opposing the first position.

15 Claims, 16 Drawing Sheets

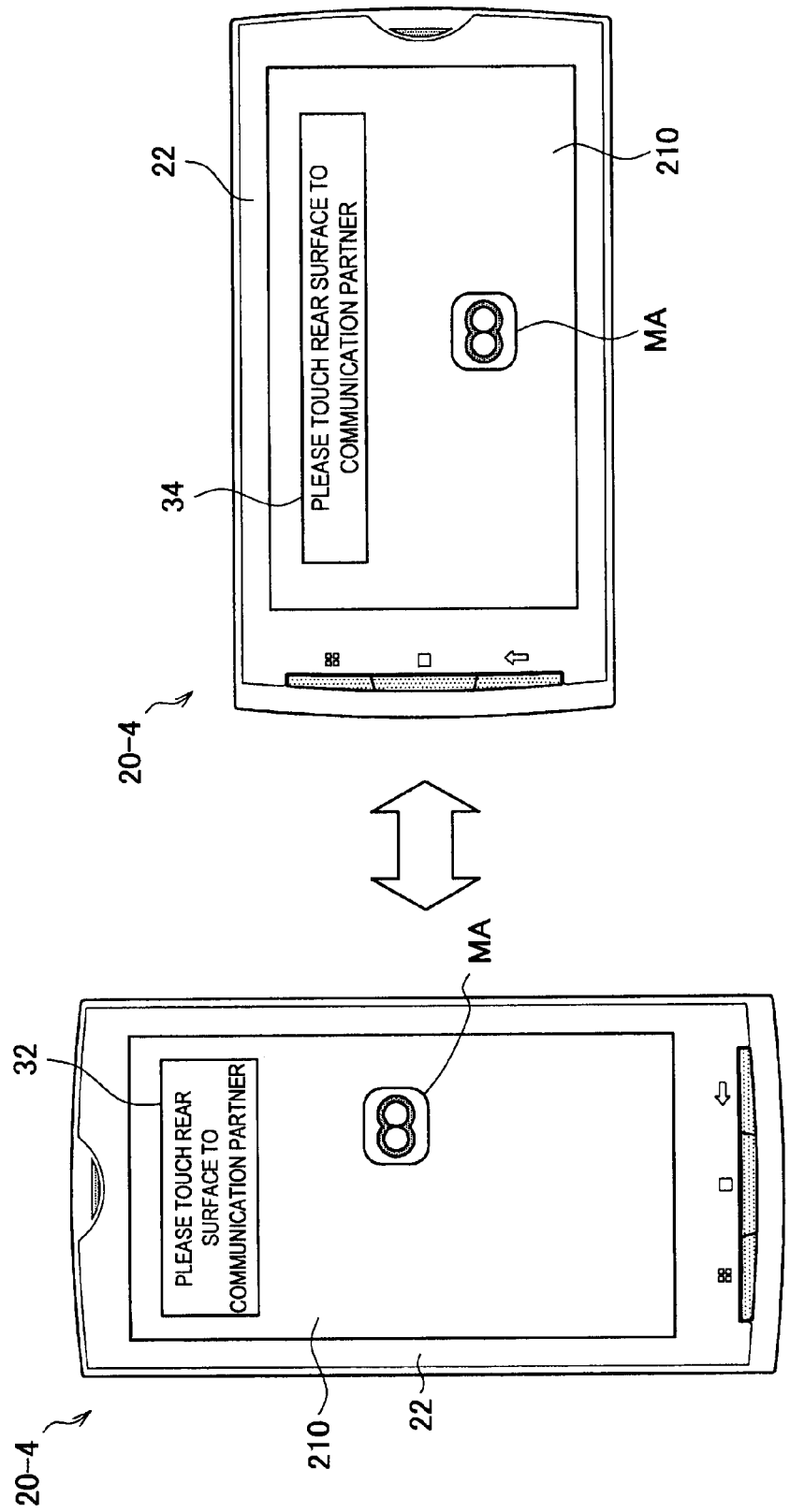

NEAR FIELD COMMUNICATION APPARATUS, DISPLAY CONTROL METHOD, AND PROGRAM

CROSS REFERENCE TO RELATED APPLICATIONS

This application claims the benefit of priority under 35 U.S.C. §119 to Japanese Patent Application JP 2011-027290 filed in the Japan Patent Office on Feb. 10, 2011, the entire content of which is hereby incorporated by reference.

BACKGROUND

The present disclosure relates to a near field communication apparatus, a display control method, and a program.

Recently, a near field communication scheme for performing communication using electric field coupling or magnetic field coupling has been proposed. In the near field communication scheme, for example, if a plurality of communication apparatuses for performing magnetic field coupling are approximated to (brought into contact with) each other, the plurality of communication apparatuses are magnetically coupled to each other and communicate with each other by the magnetic field coupling. According to the near field communication scheme based on the electric field coupling or the magnetic field coupling as described above, when a communication partner is not approximated, no signal is transmitted. Thus, the near field communication scheme is advantageous in terms of the fact that interference does not easily occur, as compared with a radio wave communication scheme defined in the IEEE 802.11 and the like. Furthermore, as another example of the near field communication, research into non-contact power transmission has also been actively conducted. In addition, the near field communication, for example, has been disclosed in Japanese Unexamined Patent Application Publication No 2009-303157.

In a near field communication apparatus for performing the near field communication, a mounting part, which is called a touch point to be approximated to a communication partner and has a near field communication function, is clearly indicated by marking such as a logo mark in many cases.

SUMMARY

Here, a mobile phone, a smart phone, a portable music player, an imaging device and the like are assumed as a near field communication apparatus. However, for the near field communication apparatus, it is also desired to allow the logo mark of a touch point to be invisible or not to be attached from the standpoint of design properties. However, if the logo mark of the touch point is simply made invisible, since it is not possible for a user to detect the touch point, it may be difficult for the mounting part having the near field communication function to be accurately approximated to a communication partner.

Furthermore, even when the logo is on the touch point, when the near field communication apparatus is approximated to the communication partner, since a user may not recognize the logo of the touch point, it may be difficult to detect a part of the near field communication apparatus that is to be approximated to the communication partner.

According to an embodiment of the present disclosure, there are provided a novel and modified near field communication apparatus, a display control method, and a program, by which a user can accurately approximate a mounting part having a near field communication function to a communication partner.

According to a first exemplary embodiment, the disclosure is directed to an information processing apparatus. The information processing apparatus includes a housing having a first surface and a second surface; a display disposed on the first surface of the housing; a near-field communication interface disposed at a first position on or beneath the second surface; and a processor configured to control the display to display a graphic indication corresponding to the near-field communication interface at a second position opposing the first position According to another exemplary embodiment, the disclosure is directed to a method performed by an information processing apparatus. The method includes controlling, by a processor of the information processing apparatus, a display disposed on a first surface of the information processing apparatus to display a graphic indication at a first position, the graphic indication corresponding to a near-field communication interface disposed at a second position on or beneath a second surface of the information processing apparatus, and the second position opposing the first position.

According to another exemplary embodiment, the disclosure is directed to a computer-readable medium including computer program instructions, which when executed by an information processing apparatus, cause the information processing apparatus to perform a method. The method comprising controlling a display disposed on a first surface of the information processing apparatus to display a graphic indication at a first position, the graphic indication corresponding to a near-field communication interface disposed at a second position on or beneath a second surface of the information processing apparatus, and the second position opposing the first position.

According to the embodiment of the present disclosure described above, it is possible for a user to accurately approximate a mounting part having a near field communication function to a communication partner.

BRIEF DESCRIPTION OF THE DRAWINGS

FIG. 18 is an explanatory diagram illustrating a detailed example of a display screen according to the fourth embodiment.

DETAILED DESCRIPTION OF THE EMBODIMENT(S)

Figure 1:
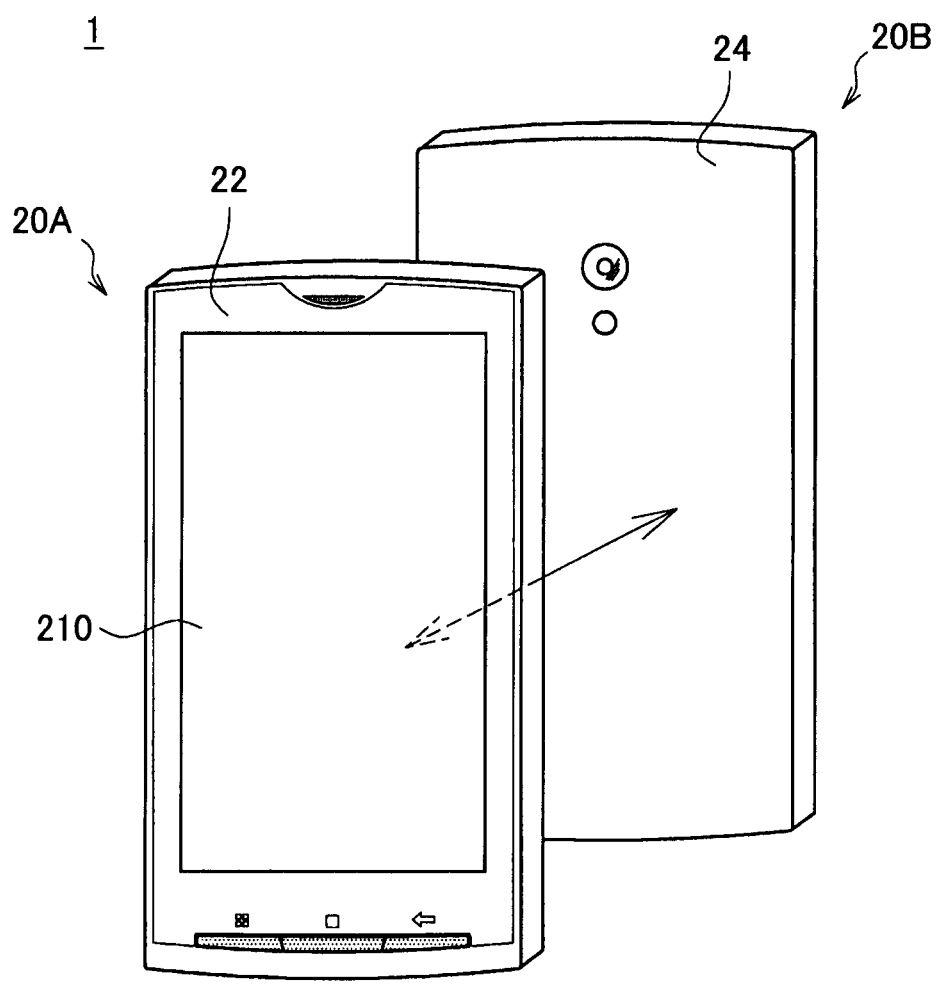
FIG. 1 is an explanatory diagram illustrating the configuration of a near field communication system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Furthermore, in the present specification and drawings, a plurality of elements having substantially the same functional configuration may be distinguished from each other by adding different letters after the same reference numeral. For example, the plurality of elements having substantially the same functional configuration, when necessary, are distinguished from each other like near field communication apparatuses 20A and 20B. However, when it is not particularly necessary to distinguish the plurality of elements having substantially the same functional configuration from each other, only the like portions are listed. For example, when it is not particularly necessary to distinguish the near field communication apparatus 20A from the near field communication apparatus 20B, they are simply called a near field communication apparatus 20.

Furthermore, the description of "preferred embodiments of the present disclosure" will be given in the following order.

1. Basic configuration of near field communication system
2. Description of each embodiment
2-1. First embodiment
2-2. Second embodiment
2-3. Third embodiment
2-4. Fourth embodiment
3. Conclusion <<1. Basic Configuration of a Near Field Communication System>>

The present disclosure can be embodied in various forms as will be described in detail in "2-1. First embodiment" to "2-4. Fourth embodiment" as examples. Furthermore, a near field communication system 20 according to each embodiment includes:

A. a display panel;

B. a near field communication unit (an electric field coupler, a coil antenna) arranged at a rear surface side of a display surface of the display panel; and C. a display control unit (a control unit) for displaying a mark indicating the near field communication unit at a position on the display panel, which corresponds to the arrangement position of the near field communication unit.

Hereinafter, the basic configuration common to the embodiments will be first described with reference to FIG. 1.

FIG. 1 is an explanatory diagram illustrating the configuration of a near field communication system 1 according to an embodiment of the present disclosure. As illustrated in FIG. 1, the near field communication system 1 according to the embodiment of the present disclosure includes a pair of near field communication apparatuses 20A and 20B. Each near field communication apparatus 20 has a front surface 22 provided thereon with a display panel 210 and a rear surface 24 facing the front surface 22, and is provided at the side of the rear surface 24 with an electrode plate called an electric field coupler capable of performing mutual electric field coupling.

Thus, if the rear surfaces 24 of the near field communication apparatuses 20A and 20B approximate each other and the distance between the electric field couplers of the near field communication apparatuses 20A and 20B, for example, is within 3 cm as illustrated in FIG. 1, a change in an induced electric field generated by one electric field coupler is detected by the other electric field coupler, so that electric field communication is performed between the near field communication apparatuses 20A and 20B.

In further detail, in the pair of apparatuses performing the electric field communication, one serves as an initiator and the other serves as a responder. The initiator transmits a connection establishment request and the responder receives the connection establishment request from the initiator.

For example, when the near field communication apparatus 20B illustrated in FIG. 1 serves as an initiator and the near field communication apparatus 20A serves as the responder, if the near field communication apparatuses 20A and 20B approximate each other, the near field communication apparatus 20A receives a connection establishment request transmitted from the near field communication apparatus 20B. After the connection establishment request is received in the near field communication apparatus 20A, the near field communication apparatuses 20A and 20B perform an authentication process as an example of a connection establishment process. If the authentication process is finished normally, the near field communication apparatuses 20A and 20B are connected to each other in a data communicable state. The authentication process, for example, may include checking as to whether versions of software or emulation schemes indicating protocols coincide with each other in the near field communication apparatuses 20A and 20B.

Then, the near field communication apparatuses 20A and 20B perform data communication in a one-to-one manner. In further detail, the near field communication apparatus 20B transmits arbitrary data to the near field communication apparatus 20A by the electric field coupler. Furthermore, the near field communication apparatus 20A transmits arbitrary data to the near field communication apparatus 20B by the electric field coupler. The arbitrary data, for example, may include music data such as music, a lecture or a radio program, video data such as a movie, a television program, a video program, a photograph, a document, a picture or a chart, a game, software and the like.

Since an electric wave emitted from an antenna is attenuated in inverse proportion to the square of the distance but the strength of an induced electric field generated from the electric field coupler is inversely proportional to the fourth power of the distance, it is advantageous in that it is possible to limit the distance between the pair of near field communication apparatuses 20 at which electric field communication can be performed. That is, according to the electric field communication, an effect is obtained in which it is possible to simplify technology for preventing the deterioration of a signal due to a peripheral obstacle and ensuring hacking and confidentiality.

Furthermore, the electric wave emitted from the antenna has a transverse wave component vibrating in a direction perpendicular to a direction in which the electric wave progresses, and a polarized wave exists therein. On the other hand, since the electric field coupler has a longitudinal wave component vibrating in the progressing direction and generates an induced electric field with no polarized wave, it is highly convenient in that a reception side can receive a signal if the surfaces of the pair of electric field couplers face each other.

In addition, in the present specification, description is given focusing on an example in which the pair of near field communication apparatuses 20 perform short range radio communication (non-contact communication) using the electric field couplers. However, the present disclosure is not limited to the example. For example, it is also possible for the pair of near field communication apparatuses 20 to perform the short range radio communication via a coil antenna capable of performing communication by magnetic field coupling. Furthermore, it is also possible for the near field communication apparatuses 20 to perform non-contact power transmission as the near field communication.

Furthermore, FIG. 1 illustrates a mobile phone as an example of the near field communication apparatus 20. However, the near field communication apparatus 20 is not limited to the mobile phone. For example, the near field communication apparatus 20 may include an information processing apparatus such as a portable music playback apparatus, a portable video processing apparatus, a personal digital assistant (PDA), a portable game machine, and an imaging apparatus.

Figure 2:
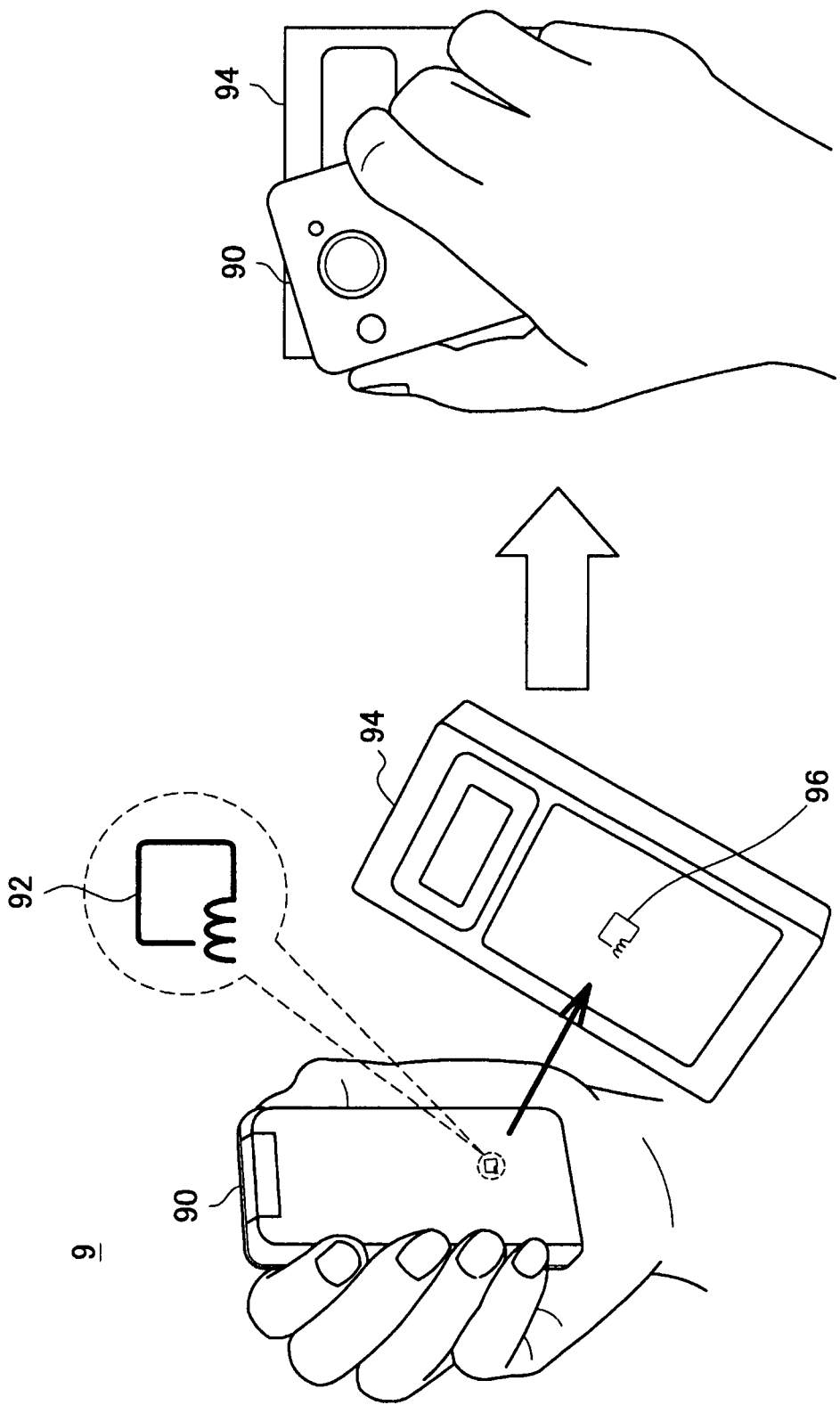
FIG. 2 is an explanatory diagram illustrating the configuration of a near field communication system according to a comparative example of the present disclosure.

Hereinafter, with reference to FIG. 2, a near field communication apparatus 2 according to a comparative example of the present disclosure will be described. FIG. 2 is an explanatory diagram illustrating the configuration of the near field communication system 2 according to the comparative example of the present disclosure. As illustrated in FIG. 2, the near field communication system 2 according to the comparative example of the present disclosure includes a mobile phone 90 and a reader/writer 94. The mobile phone 90 has a logo mark 92 indicating a touch point to be approximated to the reader/writer 94. Similarly, the reader/writer 94 has a logo mark 96 indicating a touch point to which the mobile phone 90 is to be approximated.

However, although the logo mark 92 and the logo mark 96 are on the touch points, when a user approximates the mobile phone 90 to the reader/writer 94, the user cannot view the logo mark 92 and the logo mark 96 as illustrated in the right side of FIG. 2. Therefore, there is a problem in that it is difficult for the user to detect an appropriate position of the mobile phone 90 to approximate to the reader/writer 94.

Furthermore, a portable apparatus such as the mobile phone 90, a smart phone, a portable music player or an imaging apparatus has a tendency toward an increase in the area of a display panel and the emphasis of user usability and design properties. In this regard, for the portable apparatus, it is also desired to allow the logo mark of the touch point to be invisible or not to be attached from the standpoint of design properties. However, if the logo mark of the touch point is simply made invisible, since it is not possible for a user to detect the touch point, it may be further difficult for portable apparatuses to be accurately approximated to each other.

Considering this point, each embodiment of the present disclosure has been created. According to each embodiment of the present disclosure, it is possible for a user to accurately approximate a mounting part having a near field communication function to a communication partner. Hereinafter, the embodiments of the present disclosure will be sequentially described in detail.

<<2. Description of Each Embodiment>>

First, with reference to FIGS. 3 to 7, a near field communication apparatus 20-1 according to a first embodiment of the present disclosure will be described.

(Hardware Configuration)

Figure 3:
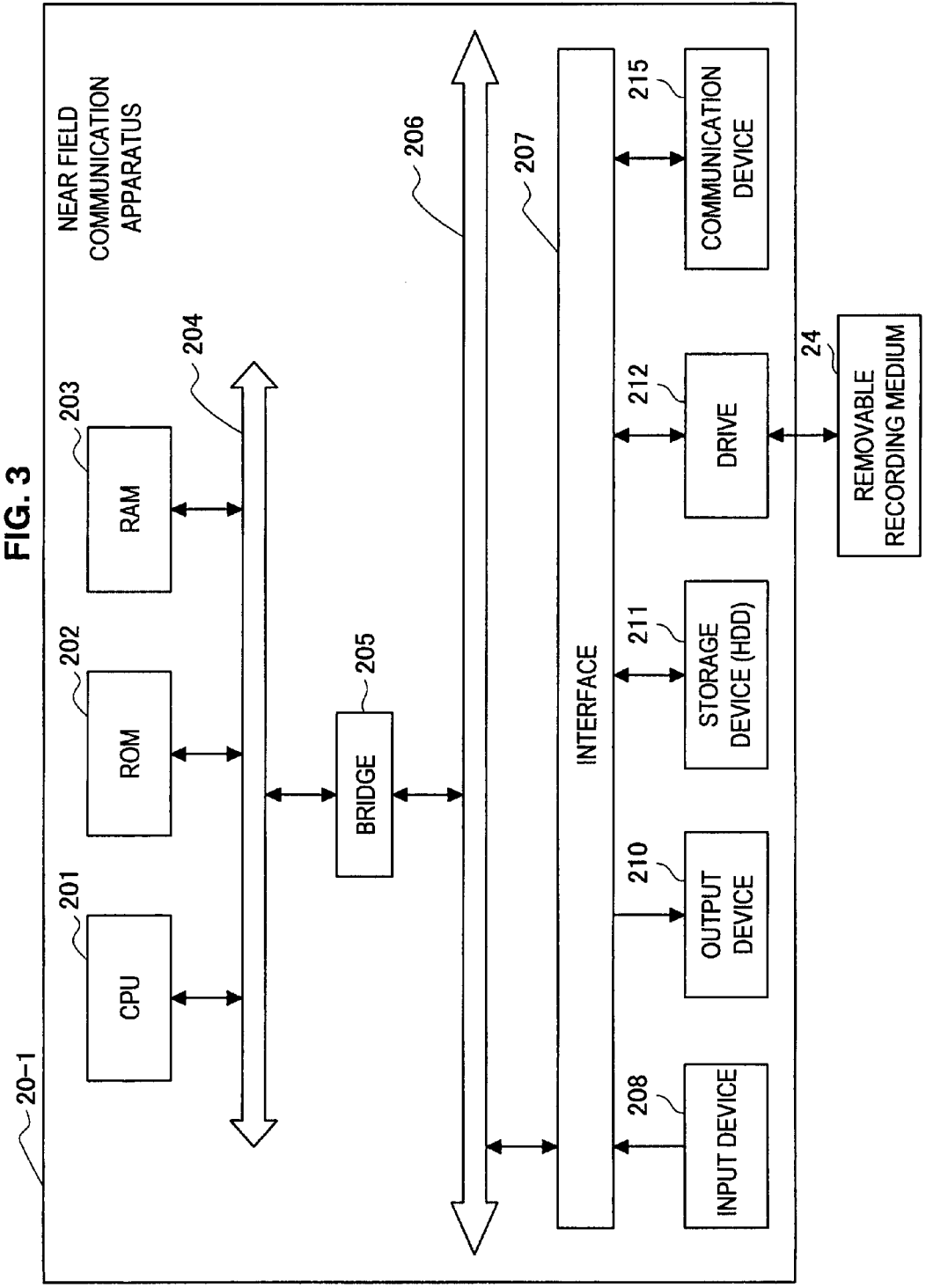
FIG. 3 is a block diagram illustrating the hardware configuration of a near field communication apparatus according to a first embodiment.

FIG. 3 is a block diagram illustrating the hardware configuration of the near field communication apparatus 20-1 according to the first embodiment. The near field communication apparatus 20-1 includes a central processing unit (CPU) 201, a read only memory (ROM) 202, a random access memory (RAM) 203, a host bus 204, a bridge 205, an external bus 206, an interface 207, an input device 208, an output device 210, a storage device (HDD) 211, a drive 212, and a communication device 215.

The CPU 201 serves as an operation processing device and a control device, and controls the overall operation of the near field communication apparatus 20-1 according to various programs. Furthermore, the CPU 201 may be a microprocessor. The ROM 202 stores programs, operation parameters and the like to be used by the CPU 201. The RAM 203 primarily stores programs to be used for the execution of the CPU 201, parameters appropriately changed in the execution thereof, and the like. The CPU 201, the ROM 202, and the RAM 203 are connected to one another by the host bus 204 including a CPU bus and the like.

The host bus 204 is connected to the external bus 206, such as a peripheral component interconnect/interface (PCI) bus, via the bridge 205. In addition, it is not necessary to separate the host bus 204, the bridge 205, and the external bus 206 from one another. For example, one bus may have the functions of the host bus 204, the bridge 205, and the external bus 206.

The input device 208, for example, includes an input unit for allowing a user to input information, an input control circuit for generating an input signal based on input from the user and outputting the input signal to the CPU 201, and the like, wherein the input unit includes a mouse, a keyboard, a touch panel, a button, a microphone, a switch, a lever and the like. It is possible for a user of the near field communication apparatus 20-1 to input various types of data to the near field communication apparatus 20-1 or to give an instruction for a processing operation to the near field communication apparatus 20-1 by manipulating the input device 208.

The output device 210, for example, includes a display device such as a liquid crystal display (LCD) device, an organic light emitting display (OLED) device or a lamp, and a sound output device such as a speaker or a headphone. The output device 210, for example, outputs reproduced content. In detail, the display unit displays various pieces of information such as reproduced video data in the form of text or an image. Meanwhile, the sound output device converts reproduced sound data and the like into a sound and outputs the sound.

The storage device 211 denotes a device for storing data. The storage device 211 may include a storage medium, a recording device for recording data on the storage medium, a reading device for reading the data from the storage medium, an erasing device for erasing the data recorded on the storage medium, and the like. The storage device 211, for example, includes a hard disk drive (HDD). The storage device 211 drives a hard disk, and stores programs to be executed by the CPU 201 and various types of data. Furthermore, the storage device 211, for example, records phone book data which will be described later.

The drive 212 denotes a reader/writer for a storage medium, and is embedded in the near field communication apparatus 20-1 or attached to an exterior of the near field communication apparatus 20-1. The drive 212 reads information recorded on a removable recording medium 24 such as a magnetic disk, an optical disc, a magneto optical disc or a semiconductor memory which is mounted in the drive 212, and outputs the information to the RAM 203.

The communication device 215 denotes an element for performing telephone communication, mail communication and the like, or an element for performing short range radio communication. The element for performing the short range radio communication, for example, includes an electric field coupler, a coil antenna and the like.

So far, the hardware configuration of the near field communication apparatus 20-1 according to the first embodiment has been described with reference to FIG. 3. The hardware configuration can also be applied to near field communication apparatuses 20-2 to 20-4 according to second to fourth embodiments which will be described later.

(Function of Near Field Communication Apparatus)

Figure 4:
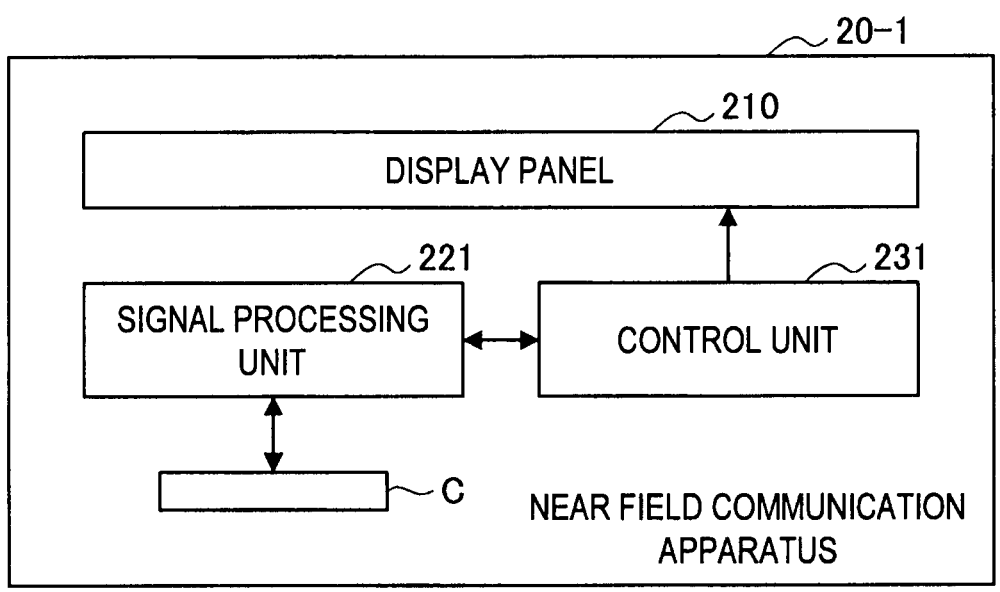
FIG. 4 is a functional block diagram illustrating the configuration of the near field communication apparatus according to the first embodiment.

FIG. 4 is a functional block diagram illustrating the configuration of the near field communication apparatus 20-1 according to the first embodiment. As illustrated in FIG. 4, the near field communication apparatus 20-1 according to the first embodiment includes a display panel 210, a signal processing unit 221, a control unit 231, and an electric field coupler C.

The display panel 210 displays various screens under the control of the control unit 231. The display panel 210 may include a liquid crystal panel or an organic EL panel. Furthermore, the display panel 210 may have a function of a touch panel for detecting user manipulation.

The electric field coupler C denotes a near field communication unit for communicating with an electric field coupler of an approximated communication partner by electric field coupling as described in "1. Basic configuration of near field communication system." The electric field coupler C is arranged at a rear surface side of a display surface of the display panel 210.

The signal processing unit 221 performs signal processing for transmission from the electric field coupler C, signal processing of a reception signal by the electric field coupler C, and the like. For example, the signal processing unit 221 performs signal processing for converting connection data such as a connection establishment request, transmission data and the like into a signal which can be transmitted from the electric field coupler C. Furthermore, the signal processing unit 221 may down-convert data received by the electric field coupler C as a high frequency signal into a baseband signal, and obtain a bit sequence based on constellation.

The control unit 231 functions as a display control unit that controls the display of the display panel 210. Specifically, the control unit 231 according to the present embodiment displays a mark indicating the touch point of the side of the rear surface 24 at a position on the display panel 210 corresponding to the arrangement position of the electric field coupler C. Hereinafter, this point will be described in detail with reference to FIGS. 5 and 6.

Figure 5:
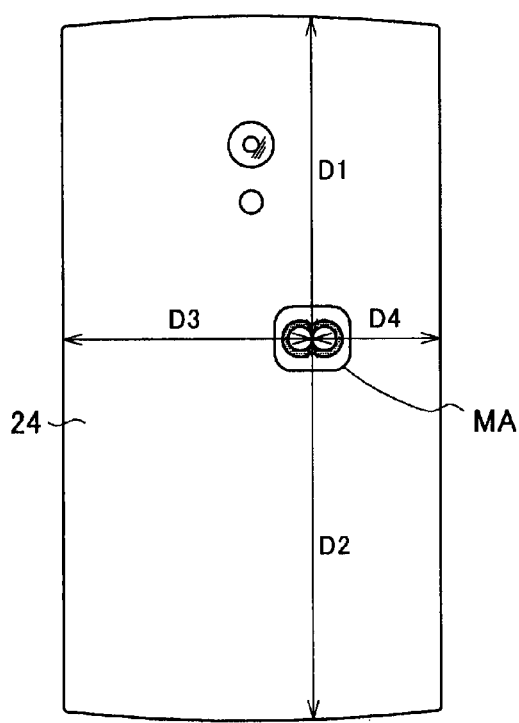
FIG. 5 is an external appearance view illustrating a rear surface of the near field communication apparatus according to the first embodiment.

FIG. 5 is an external appearance view illustrating the rear surface 24 of the near field communication apparatus 20-1 according to the first embodiment. As illustrated in FIG. 5, the near field communication apparatus 20-1 is provided on the rear surface 24 thereof with a mark MA. The mark MA is provided at a touch point, that is, a part provided inside with the electric field coupler C. The mark MA may be stamped on the rear surface 24 of the near field communication apparatus 20-1 or sealed by the rear surface 24 of the near field communication apparatus 20-1.

Figure 6:
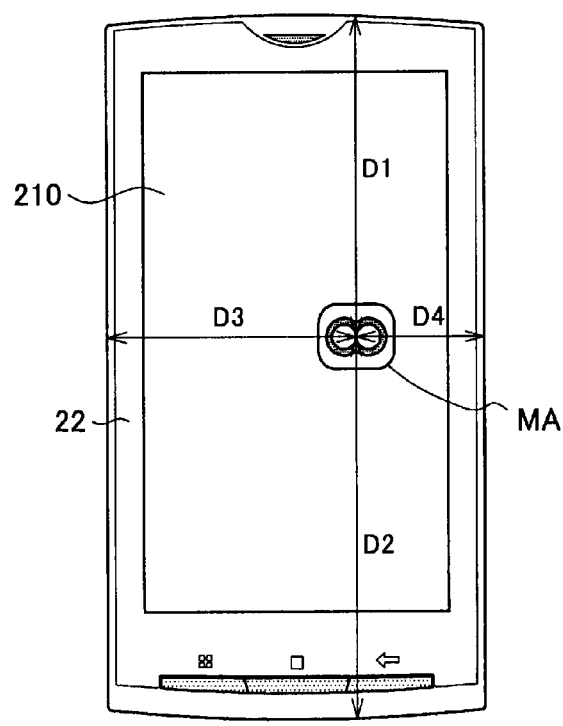
FIG. 6 is an external appearance view illustrating a front surface of the near field communication apparatus according to the first embodiment.

FIG. 6 is an external appearance view illustrating the front surface 22 of the near field communication apparatus 20-1 according to the first embodiment. As illustrated in FIG. 6, the control unit 231 according to the first embodiment displays the mark MA at a position on the display panel 210 corresponding to the mark MA of the rear surface 24. In detail, the control unit 231 displays the mark MA on the display panel 210 such that the mark MA is positioned on a line perpendicular to a display surface passing through the electric field coupler C (the touch point). That is, as illustrated in FIGS. 5 and 6, the control unit 231 displays the mark MA such that distances D1 to D4 from four sides of the near field communication apparatus 20-1 to the mark MA displayed on the display panel 210 coincide with distances D1 to D4 from four sides of the rear surface 24 to the mark MA, respectively.

It should further be noted that the information indicating the position on the display panel on which the mark MA is displayed can be obtained from a variety of different sources. In one exemplary embodiment, this position information may be obtained from any one or more of the ROM 202, RAM 203 and/or storage device 211. The position information may also be obtained from a server via the communication device 215 by transmitting identification information corresponding to the near field communication apparatus 20-1 to the server. Based on this identification information, the server may then retrieve the position information and provide this position information to the near field communication apparatus 20-1 via the communication device 215.

With such a configuration, it is possible for a user to approximate the touch point to a communication partner by recognizing the mark MA displayed on the display panel 210, other than the mark MA of the rear surface 24.

In addition, recently, since there is a tendency that only a logo mark of a maker is provided on the rear surface 24 from the standpoint of the emphasis of design properties, although the mark MA of the rear surface 24 is not provided according to the tendency, there is a merit that a user can detect a touch point by the displayed mark MA. Furthermore, if the mark MA of the rear surface 24 has faded out with time, a user can recognize the touch point according to the present embodiment.

However, if only the mark MA is displayed on the display panel 210, a user may abnormally recognize the display position of the mark MA as a touch point and approximate the display panel 210 of the front surface 22, rather than the rear surface 24, to a communication partner. In this regard, as illustrated in FIG. 7, the control unit 231 may displays a guide display, which is used to guide the rear surface 24 to be approximated to a communication partner, on the display panel 210, in addition to the mark MA.

Figure 7:
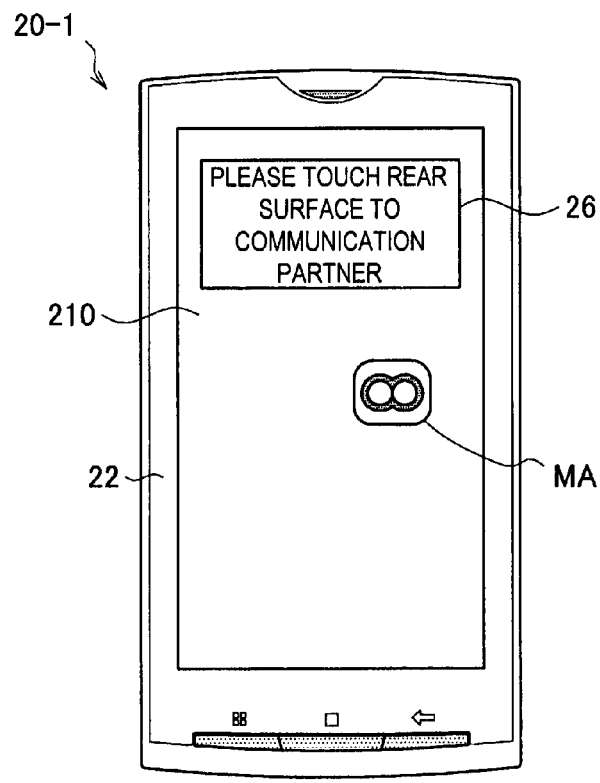
FIG. 7 is an explanatory diagram illustrating a modified example of a display screen according to the first embodiment.

FIG. 7 is an explanatory diagram illustrating a modified example of the display screen according to the first embodiment. As illustrated in FIG. 7, the control unit 231 may display a message 26, "Please touch the rear surface to the communication partner," on the display panel 210. With such a configuration, it is possible to allow a user to recognize that a touch point is on the rear surface 24.

The message 26 is only an example of the guide display for guiding the rear surface 24 to be approximated to the communication partner. Thus, the guide display may include a message with different content or an image representing the approximation of the rear surface 24 to the communication partner.

<2-2. Second Embodiment>

So far, the first embodiment of the present disclosure has been described. Next, the second embodiment of the present disclosure will be described.

(Configuration of Near Field Communication Apparatus)

Figure 8:
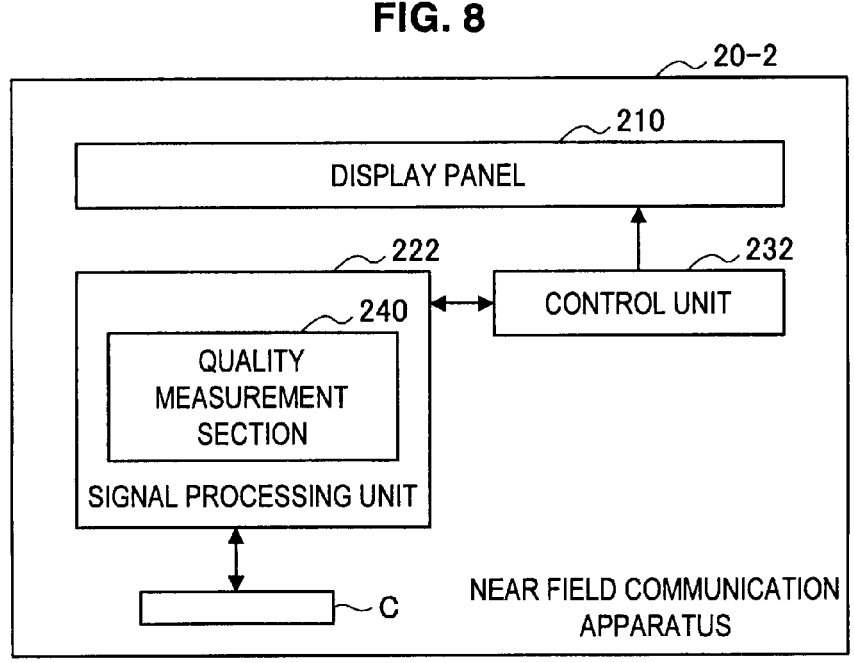
FIG. 8 is a functional block diagram illustrating a near field communication apparatus according to a second embodiment of the present disclosure.

FIG. 8 is a functional block diagram illustrating a near field communication apparatus 20-2 according to the second embodiment of the present disclosure. As illustrated in FIG. 8, the near field communication apparatus 20-2 according to the second embodiment includes a display panel 210, a signal processing unit 222, a control unit 232, and an electric field coupler C. In addition, since the display panel 210 and the electric field coupler C have the same functions as those described in the first embodiment, configurations different from those of the first embodiment will be mainly described below.

The signal processing unit 222 performs signal processing for transmission from the electric field coupler C, signal processing of a reception signal by the electric field coupler C, and the like. Furthermore, the signal processing unit 222 has a function of a quality measurement section 240 that measures the signal quality of the reception signal by the electric field coupler C. For example, the quality measurement section 240 measures received signal strength indication (RSSI) of the reception signal, or a packet error rate (PER) as the signal quality.

The control unit 232 displays a mark indicating a touch point of the side of the rear surface 24 at a position on the display panel 210 corresponding to an arrangement position of the electric field coupler C. Moreover, the control unit 232 according to the present embodiment changes a display mode according to the communication quality measured by the quality measurement section 240. For example, the control unit 232 may increase the display size of the mark as the communication quality measured by the quality measurement section 240 is good. Hereinafter, this point will be described in detail with reference to FIG. 9.

Figure 9:
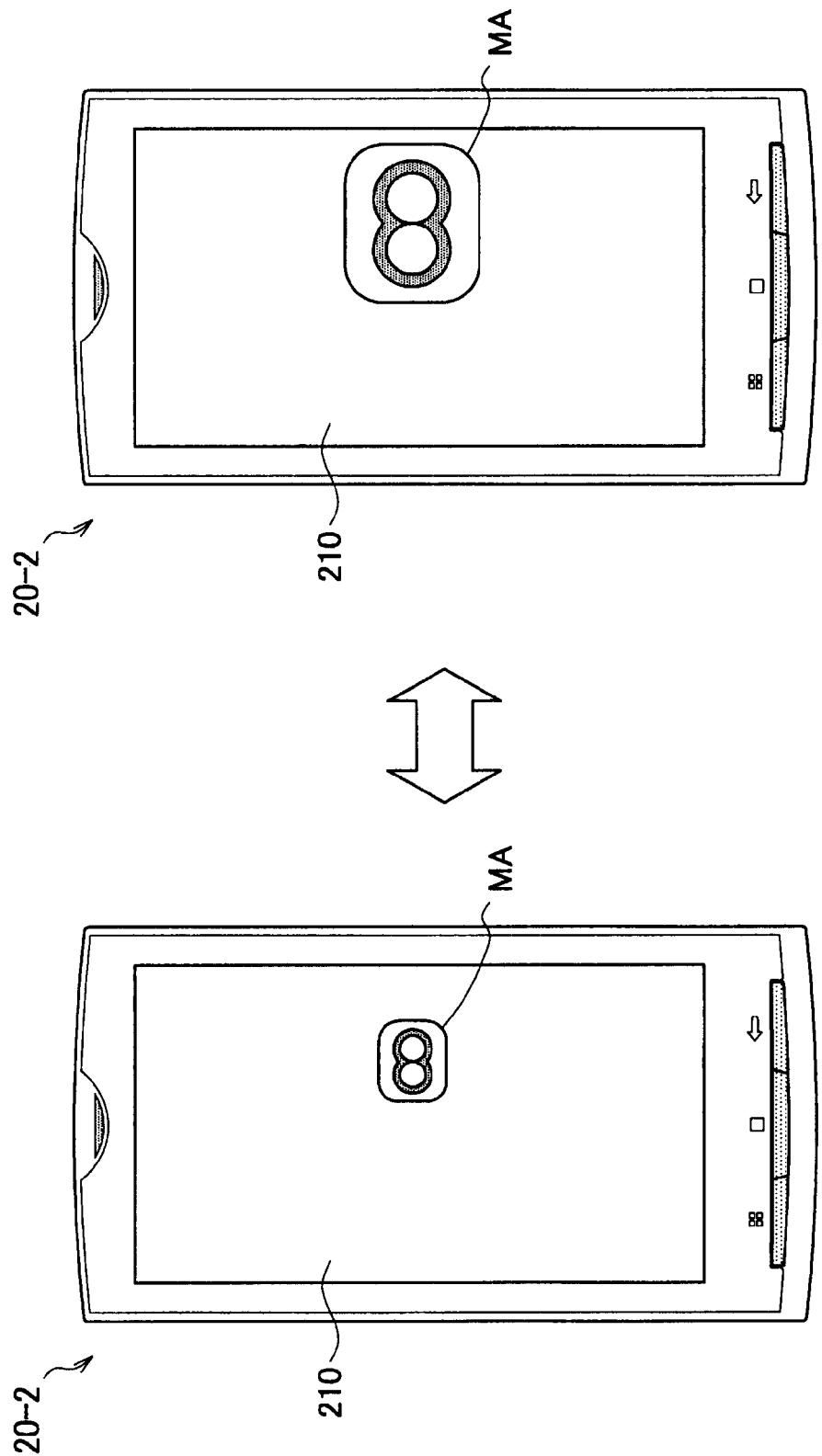
FIG. 9 is an explanatory diagram illustrating a detailed example of a display mode according to a communication quality of a mark.

FIG. 9 is an explanatory diagram illustrating a detailed example of a display mode according to the communication quality of the mark. In further detail, the left side of FIG. 9 illustrates a display mode of a mark MA when the communication quality measured by the quality measurement section 240 is smaller than a threshold value, and the right side of FIG. 9 illustrates the display mode of the mark MA when the communication quality measured by the quality measurement section 240 is larger than the threshold value. When the communication quality measured by the quality measurement section 240 is larger than the threshold value, the control unit 232 may display the mark MA in a larger size than when the communication quality is smaller than the threshold value, as illustrated in FIG. 9.

With such a configuration, a user can perform optimal positioning with respect to a communication partner based on the size of the mark MA. Furthermore, an allowable amount of positional deviation between the touch point of the near field communication apparatus 20-2 and the touch point of a communication partner is increased when the communication quality is larger than the threshold value while being reduced when the communication quality is smaller than the threshold value. Consequently, since accurate positioning is more important when the communication quality is smaller than the threshold value, it is effective for the mark MA to be displayed in a small size when the communication quality is smaller than the threshold value while being displayed in a large size when the communication quality is larger than the threshold value from the standpoint of the above fact.

So far, the example in which the display size of the mark is increased as the communication quality is good has been described. However, the display size of the mark may be increased as the communication quality is bad. With such a configuration, the mark is displayed with a large size when the communication quality is bad, so that it is possible to call the attention of a user to positioning.

(Operation of Near Field Communication Apparatus)

Figure 10:
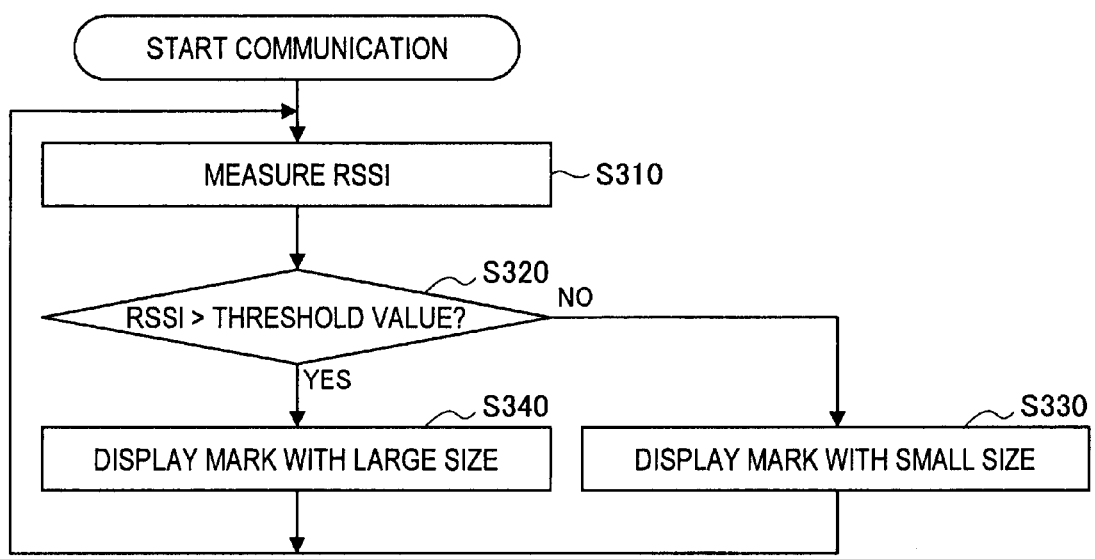
FIG. 10 is an explanatory diagram illustrating a first operation example of a near field communication apparatus according to a second embodiment of the present disclosure.

Next, with reference to FIGS. 10 and 11, the operation of the near field communication apparatus 20-2 according to the second embodiment will be described. FIG. 10 is an explanatory diagram illustrating a first operation example of the near field communication apparatus 20-2 according to the second embodiment of the present disclosure. As illustrated in FIG. 10, if the near field communication apparatus 20-2 starts to communicate with a communication partner, the quality measurement section 240 measures an RSSI (S310).

When the RSSI is equal to or less than a threshold value ("no" in S320), the control unit 232 displays the mark MA in a small size on the display panel 210 (S330). Meanwhile, when the RSSI exceeds the threshold value ("yes" in S320), the control unit 232 displays the mark MA in a large size on the display panel 210 (S340).

Figure 11:
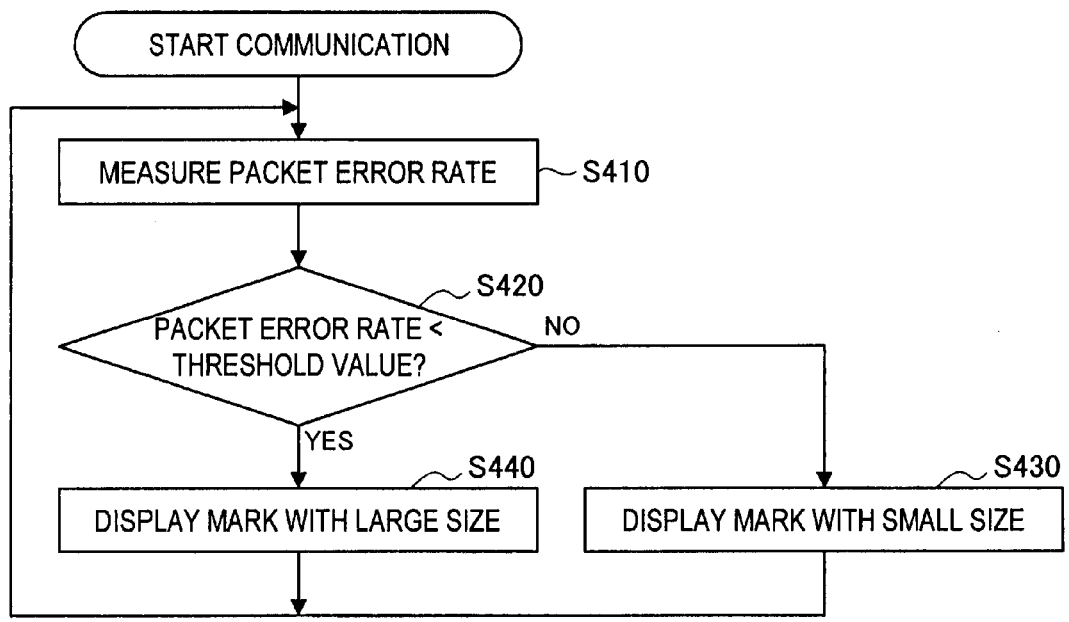
FIG. 11 is an explanatory diagram illustrating a second operation example of the near field communication apparatus according to the second embodiment of the present disclosure.

FIG. 11 is an explanatory diagram illustrating a second operation example of the near field communication apparatus 20-2 according to the second embodiment of the present disclosure. As illustrated in FIG. 11, if the near field communication apparatus 20-2 starts to communicate with a communication partner, the quality measurement section 240 measures a packet error rate (S410).

When the packet error rate is equal to or more than a threshold value ("no" in S420), the control unit 232 displays the mark MA in a small size on the display panel 210 (S430). Meanwhile, when the packet error rate becomes less than the threshold value ("yes" in S420), the control unit 232 displays the mark MA in a large size on the display panel 210 (S440).

(Modified Example)

So far, the example in which the display size of the mark MA is changed in two stages has been described. However, the present embodiment is not limited to the example. For example, the control unit 232 may change the display size of the mark MA in proportion to the RSSI or the packet error rate.

Furthermore, the example in which the control unit 232 controls the display size of the mark MA based on the RSSI or the packet error rate has been described. However, the RSSI and the packet error rate are only examples of communication quality indicators. For example, the control unit 232 may control the display size of the mark MA based on both the RSSI and the packet error rate, or based on an index indicating another communication quality.

Furthermore, the example in which the control unit 232 controls the display size of the mark MA according to the communication quality as an example of the display mode of the mark MA has been described. However, the display mode of the mark MA controlled by the control unit 232 is not limited to the display size. For example, the control unit 232 may control a color (red, white and the like), luminance (bright, dark) and the like of the mark MA according to the communication quality.

Figure 12:
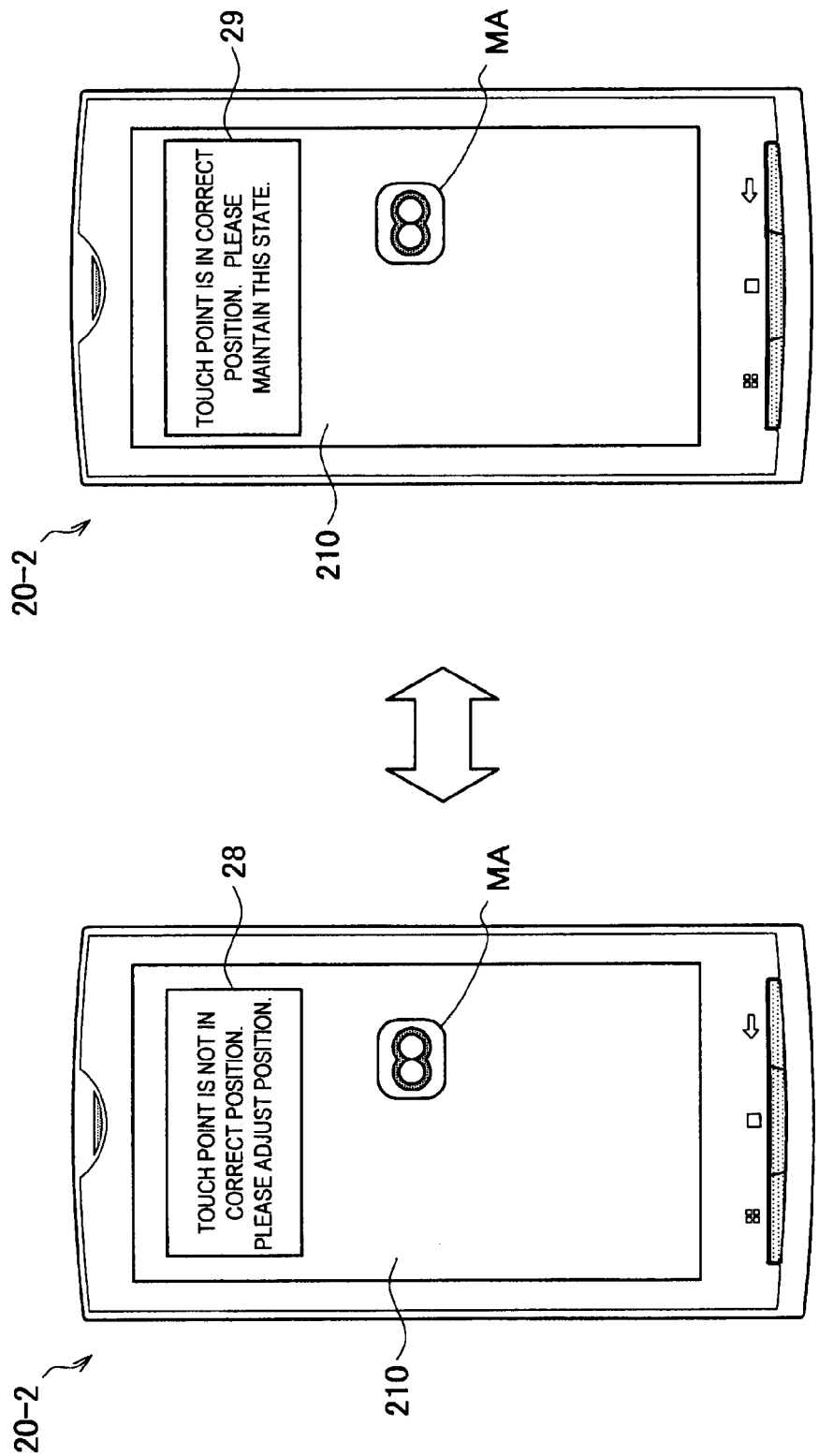
FIG. 12 is an explanatory diagram illustrating a modified example of a display screen according to the second embodiment.

Moreover, as illustrated in FIG. 12, the control unit 232 may display a guide display according to the communication quality measured by the quality measurement section 240 on the display panel 210.

FIG. 12 is an explanatory diagram illustrating a modified example of the display screen according to the second embodiment. In further detail, the left side of FIG. 12 illustrates a display screen when the communication quality measured by the quality measurement section 240 is smaller than a threshold value, and the right side of FIG. 12 illustrates the display screen when the communication quality measured by the quality measurement section 240 is larger than the threshold value.

When the communication quality is smaller than the threshold value, the control unit 232 displays a guide display 28 stating, "The touch point is not in the correct position. Please adjusts the position," on the display panel 210 as illustrated in FIG. 12. Meanwhile, when the communication quality is larger than the threshold value, the control unit 232 displays a guide display 29 stating, "The touch point is in the correct position. Please maintains this state," on the display panel 210. A user checks the guide display 28 or the guide display 29, thereby recognizing the positional relation between the touch point of the near field communication apparatus 20-2 and the touch point of the communication partner.

<2-3. Third Embodiment>

So far, the second embodiment of the present disclosure has been described. Next, the third embodiment of the present disclosure will be described. In recent years, there is a tendency for a plurality of near field communication functions to be mounted in one communication apparatus. However, providing the communication apparatus with marks indicating touch points of each near field communication function may further degrade design properties. The third embodiment of the present disclosure has been made taking this point into consideration.

Figure 13:
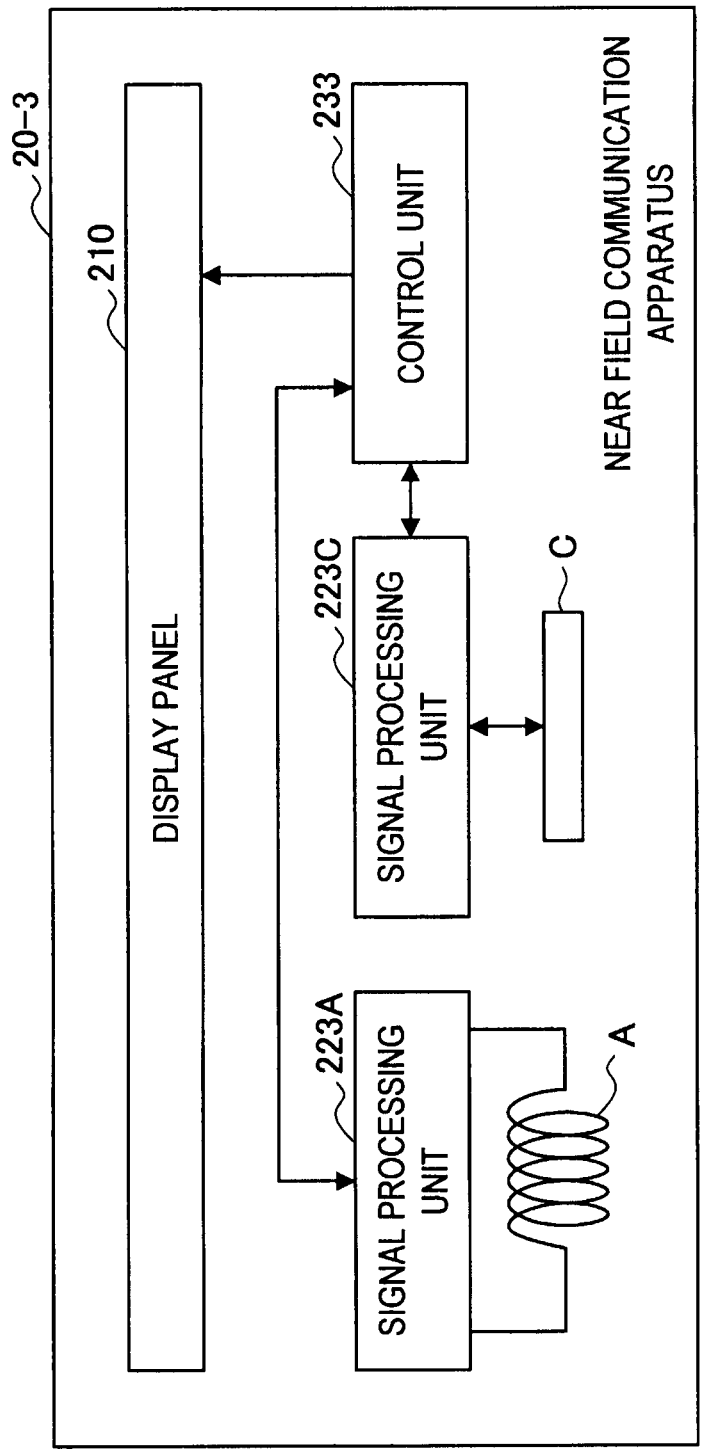
FIG. 13 is a functional block diagram illustrating a near field communication apparatus according to a third embodiment of the present disclosure.

FIG. 13 is a functional block diagram illustrating a near field communication apparatus 20-3 according to the third embodiment of the present disclosure. As illustrated in FIG. 13, the near field communication apparatus 20-3 according to the third embodiment includes a display panel 210, a signal processing unit 223A, a signal processing unit 223C, a control unit 233, a coil antenna A, and an electric field coupler C. In addition, since the display panel 210 and the electric field coupler C have the same functions as those described in the first embodiment, configurations different from those of the first embodiment will be mainly described below.

The coil antenna A denotes a near field communication unit that constitutes an LC resonant circuit including an inductance component and a capacitance component, and communicates with a coil antenna of a communication partner by magnetic field coupling. The coil antenna A is arranged at a rear surface side of a display surface of the display panel 210.

A signal processing unit 223A performs signal processing for transmission from the coil antenna A, signal processing for of a reception signal by the coil antenna A, and the like. The signal processing unit 223C performs signal processing for transmission from the electric field coupler C, signal processing of a reception signal by the electric field coupler C, and the like.

The control unit 233, when necessary, displays a mark MA, which indicates a touch point for electric field communication by the electric field coupler C, or a mark MB, which indicates a touch point for magnetic field communication by the coil antenna A, on the display panel 210. Hereinafter, this point will be described in detail with reference to FIGS. 14 and 15.

Figure 14:
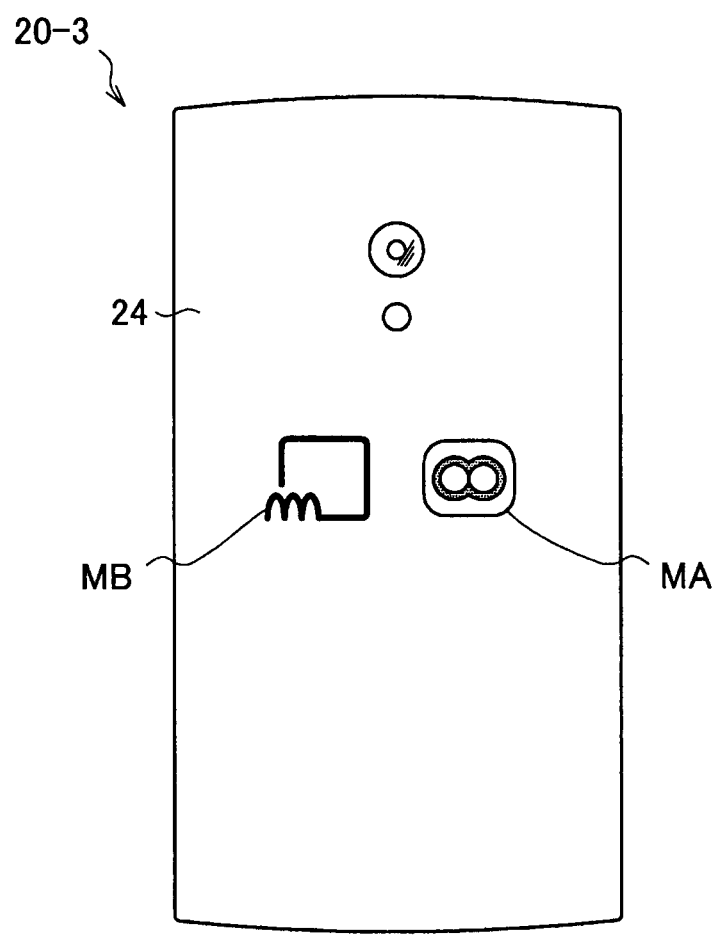
FIG. 14 is an external appearance view illustrating a rear surface of the near field communication apparatus according to the third embodiment.

FIG. 14 is an external appearance view illustrating a rear surface 24 of the near field communication apparatus 20-3 according to the third embodiment. As illustrated in FIG. 14, the near field communication apparatus 20-3 is provided on the rear surface 24 thereof with the mark MA and the mark MB. The mark MA is provided at a touch point for electric field communication by the electric field coupler C, that is, a part provided inside with the electric field coupler C. Meanwhile, the mark MB is provided at a touch point for magnetic field communication by the coil antenna A, that is, a part provided inside with the coil antenna A.

Figure 15:
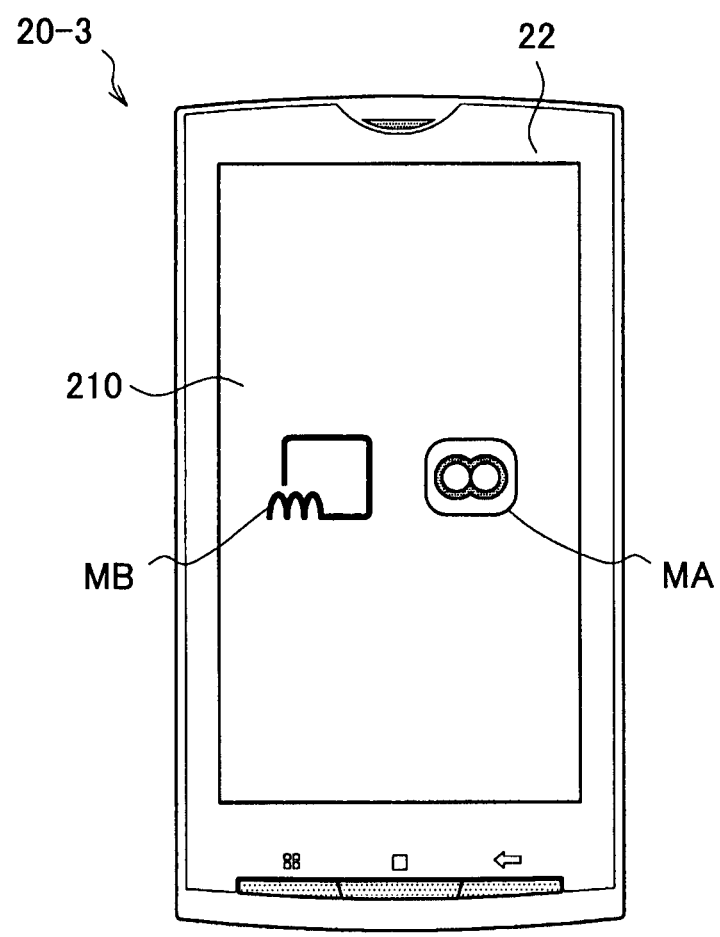
FIG. 15 is an external appearance view illustrating a front surface of the near field communication apparatus according to the third embodiment.

FIG. 15 is an external appearance view illustrating a front surface 22 of the near field communication apparatus 20-3 according to the third embodiment. As illustrated in FIG. 15, in the case of using an electric field communication function and a magnetic field communication function, the control unit 233 according to the third embodiment displays the mark MA at a position on the display panel 210 corresponding to the mark MA of the rear surface 24, and displays the mark MB at a position on the display panel 210 corresponding to the mark MB of the rear surface 24.

As described above, according to the third embodiment of the present disclosure, even in the near field communication apparatus 20-3 having a plurality of near field communication functions, a touch point for each near field communication function can be clearly indicated on the display panel 210.

(Operation of Near Field Communication Apparatus)

Figure 16:
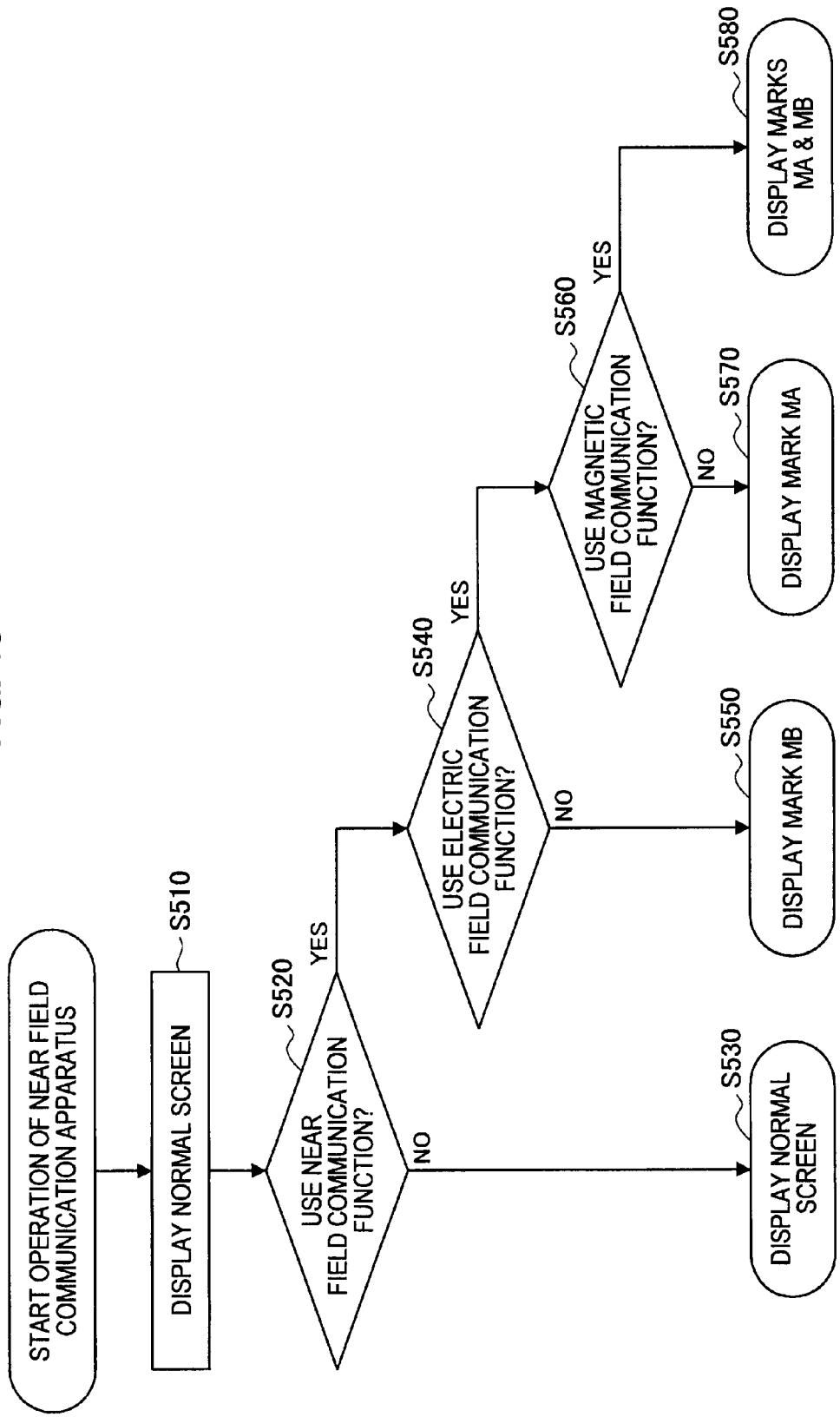
FIG. 16 is an explanatory diagram illustrating the operation of the near field communication apparatus according to the third embodiment of the present disclosure.

Next, the operation of the near field communication apparatus 20-3 according to the third embodiment will be described with reference to FIG. 16. FIG. 16 is an explanatory diagram illustrating an operation of the near field communication apparatus 20-3 according to the third embodiment of the present disclosure. As illustrated in FIG. 16, if the near field communication apparatus 20-3 starts to operate, the control unit 233 displays a normal screen such as a menu screen on the display panel 210 (S510). Then, when no near field communication function is used ("no" in S520), the control unit 233 maintains the display of the normal screen (S530).

Meanwhile, when a magnetic communication function of the near field communication function is used ("yes" in S520, "no" in S540), the control unit 233 displays the mark MB on the display panel 210 (S550). Furthermore, when an electric communication function is used ("yes" in 5540, "no" in S560), the control unit 233 displays the mark MA on the display panel 210 (S570). Moreover, when the magnetic communication function and the electric communication function are used ("yes" in S560), the control unit 233 displays both the mark MA and the mark MB on the display panel 210 (S580).

As described above, according to the third embodiment, a mark indicating a touch point is displayed on the display panel 210 only when the near field communication function is used, so that it is possible to prevent the mark from becoming an obstruction on a display screen when no near field communication function is used.

<2-4. Fourth Embodiment>

Figure 17:
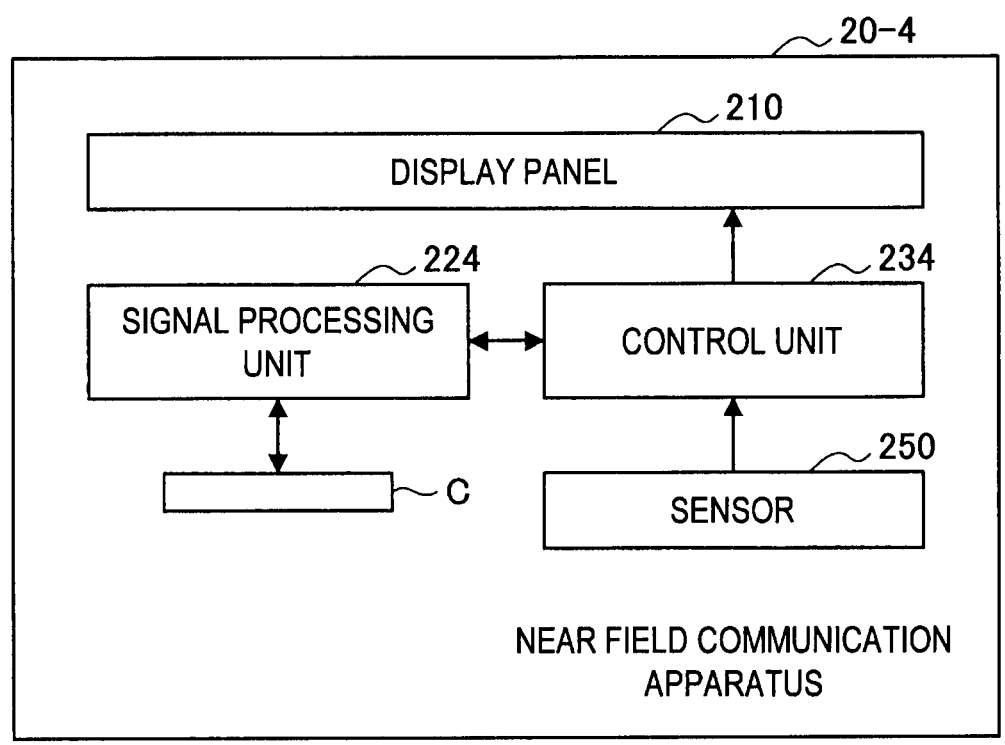
FIG. 17 is a functional block diagram illustrating a near field communication apparatus according to a fourth embodiment of the present disclosure.

So far, the third embodiment of the present disclosure has been described. Next, the fourth embodiment of the present disclosure will be described. FIG. 17 is a functional block diagram illustrating a near field communication apparatus 20-4 according to the fourth embodiment of the present disclosure. As illustrated in FIG. 17, the near field communication apparatus 20-4 according to the fourth embodiment includes a display panel 210, a signal processing unit 224, a control unit 234, a sensor 250, and an electric field coupler C. In addition, since the display panel 210 and the electric field coupler C have the same functions as those described in the first embodiment, configurations different from those of the first embodiment will be mainly described below.

The sensor 250 detects a posture of the near field communication apparatus 20-4. For example, the sensor 250 includes a gyro sensor and the like, and detects an angle of the near field communication apparatus 20-4 such as a longitudinal direction or a transverse direction of the near field communication apparatus 20-4.

The control unit 234 controls a display direction of the mark MA on the display panel 210 according to the posture of the near field communication apparatus 20-4 detected by the sensor 250. Hereinafter, this point will be described in detail with reference to FIG. 18.

FIG. 18 is an explanatory diagram illustrating a detailed example of a display screen according to the fourth embodiment. In further detail, the left side of FIG. 18 illustrates a display screen when the posture of the near field communication apparatus 20-4 is vertical, and the right side of FIG. 18 illustrates a display screen when the posture of the near field communication apparatus 20-4 is horizontal. As illustrated in FIG. 18, the control unit 234 changes the display direction of the mark MA on the display panel 210 according to the direction of the near field communication apparatus 20-4, thereby allowing a user to recognize the mark MA at a correct angle regardless of the direction of the near field communication apparatus 20-4.

<<3. Conclusion>>

As described above, according to the embodiments of the present disclosure, the mark MA displayed on the display panel 210, rather than the mark MA of the rear surface 24, is recognized, so that the touch point can be approximated to a communication partner. Furthermore, recently, since there is a tendency for only a logo mark of a maker to be provided on the rear surface 24 from the standpoint of the emphasis of design properties, there is a merit that a user can detect the touch point by the mark MA displayed even when the mark MA of the rear surface 24 is not provided according to this tendency.

So far, the preferred embodiments of the present disclosure have been described in detail with reference to the appended drawings. However, the present disclosure is not limited thereto. It is apparent that a person having an ordinary skill in the technical field to which the present disclosure pertains can arrive at various modified examples or corrected examples within the category of the technical idea described in claims, and it is understood that the modified examples or the corrected examples are naturally included in the technical range of the present disclosure.

For example, two or more embodiments of the first embodiment to fourth embodiment of the present disclosure can be combined with each other. In detail, the technical range of the present disclosure includes a combination of the first embodiment and the second embodiment, a combination of the first embodiment and the third embodiment, a combination of the first embodiment and the fourth embodiment, a combination of the second embodiment and the third embodiment, a combination of the second embodiment and the fourth embodiment, a combination of the third embodiment and the fourth embodiment, a combination of the first to third embodiments, a combination of the first, third and fourth embodiments, a combination of the second to fourth embodiments, and a combination of the first to fourth embodiments.

Furthermore, the steps in the process of the near field communication apparatus 20 of the present specification are not necessarily processed in time series along the sequence set forth as a flowchart. For example, the steps in the process of the near field communication apparatus 20 may be processed along a sequence different from the sequence set forth as the flowchart or processed in a parallel manner.

Furthermore, a computer program for causing hardware such as the CPU 201, the ROM 202 and the RAM 203 embedded in the near field communication apparatus 20 to perform the same function as that of each configuration of the near field communication apparatus 20 can be created. Furthermore, a recording medium having recorded the computer program is also provided.

It should be understood by those skilled in the art that various modifications, combinations, sub-combinations and alterations may occur depending on design requirements and other factors insofar as they are within the scope of the appended claims or the equivalents thereof.

For example, the present technology can adopt the following configurations.

(1) A near field communication apparatus comprising:
a display panel;
a near field communication unit arranged at a rear surface side of a display surface of the display panel; and
a display control unit that displays a mark indicating the near field communication unit at a position on the display panel corresponding to an arrangement position of the near field communication unit.

(2) The near field communication apparatus according to the (1), wherein the display control unit displays the mark on the display panel such that the mark is positioned on a line perpendicular to the display surface passing through the near field communication unit.

(3) The near field communication apparatus according to the (1) or (2), wherein the display control unit displays the mark on the display panel when the near field communication unit is used.

(4) The near field communication apparatus according to any one of the (1) to (3), wherein the display control unit displays a display used to guide the rear surface side of the display surface of the display panel to be approximated to a communication partner on the display panel, in addition to the mark.

(5) The near field communication apparatus according to any one of the (1) to (4), comprising:
a plurality types of near field communication units,
wherein, when one or at least two of the near field communication units are used, the display control unit displays a mark indicating the one or at least two near field communication units on the display panel.

(6) The near field communication apparatus according to any one of the (1) to (5), further comprising:
a quality measurement section that measures a communication quality of communication with the communication partner by the near field communication unit,
wherein the display control unit changes a display mode of the mark according to the communication quality measured by the quality measurement section.

(7) The near field communication apparatus according to the (6), wherein the display control unit increases a display size of the mark when an RSSI measured by the quality measurement section is high.

(8) The near field communication apparatus according to the (6), wherein the display control unit increases a display size of the mark when a packet error rate measured by the quality measurement section is low.

(9) The near field communication apparatus according to any one of the (6) to (8), wherein the near field communication unit measures a communication quality of communication with the communication partner, and the display control unit displays a guide display according to the communication quality measured by the quality measurement section on the display panel.

(10) The near field communication apparatus according to any one of the (1) to (9), further comprising:

a sensor that detects a posture of the near field communication apparatus, wherein the display control unit changes a display direction of the mark on the display panel according to a detection result of the sensor.

(11) A display control method by which a near field communication apparatus including a display panel and a near field communication unit arranged at a rear surface side of a display surface of the display panel displays a mark indicating the near field communication unit at a position on the display panel corresponding to an arrangement position of the near field communication unit.

(12) A program that allows a computer to function as a display panel, a near field communication unit arranged at a rear surface side of a display surface of the display panel, and a display control unit that displays a mark indicating the near field communication unit at a position on the display panel corresponding to an arrangement position of the near field communication unit

What is claimed is:

1. An information processing apparatus, comprising:
a housing having a first surface and a second surface;
a display disposed on the first surface of the housing;
a near-field communication interface disposed at a first position on or beneath the second surface; and
a processor configured to
control the display to display a graphic indication corresponding to the near-field communication interface at a second position opposing the first position;
measure a quality of a signal received at the near-field communication interface; and
control the display to display the graphic indication at a first size when the measured signal quality is below a threshold value and to display the graphic indication at a second size when the measured signal quality is above the threshold value.

2. The information processing apparatus of claim 1, wherein the processor controls the display to display an instruction corresponding to the near-field communication interface.

3. The information processing apparatus of claim 2, wherein the instruction is an instruction to place the second surface of the housing in proximity to another information processing apparatus.

4. The information processing apparatus of claim 1, wherein the measured quality of the signal is a measured received signal strength indication (RSSI) of the signal received at the near-field communication interface.

5. The information processing apparatus of claim 1, wherein the measured quality of the signal is a packet error rate (PER) corresponding to the signal received at the near-field communication interface.

6. The information processing apparatus of claim 1, wherein the processor controls a display effect of the graphic indication based on the measured quality of the signal received at the near-field communication interface.

7. The information processing apparatus of claim 1, wherein the processor compares the measured signal quality to the predetermined threshold value.

8. The information processing apparatus of claim 1, wherein the second size is greater than the first size.

9. The information processing apparatus of claim 1, wherein the second size is smaller than the first size.

10. The information processing apparatus of claim 1, wherein the processor controls the display to display the graphic indication at a size proportionally related to the measured quality of the signal received at the near-field communication interface.

11. An information processing apparatus, comprising:
a housing having a first surface and a second surface;
a display disposed on the first surface of the housing;
a near-field communication interface disposed at a first position on or beneath the second surface; and
a processor configured to
control the display to display a graphic indication corresponding to the near-field communication interface at a second position opposing the first position;
measure a quality of a signal received at the near-field communication interface;
control the display to display an instruction to maintain a position of the information processing apparatus when the measured signal quality is above a threshold value; and
control the display to display an instruction to modify a position of the information processing apparatus when the measured signal quality is below the threshold value.

12. The information processing apparatus of claim 1, further comprising:
a second near-field communication interface disposed at a third position on or beneath the second surface.

13. The information processing apparatus of claim 12, wherein the processor controls the display to display a second graphic indication corresponding to the second near-field communication interface at a fourth position opposing the first position.

14. An information processing apparatus, comprising:
a housing having a first surface and a second surface;
a display disposed on the first surface of the housing;
a near-field communication interface disposed at a first position on or beneath the second surface; and
a processor configured to
control the display to display a graphic indication corresponding to the near-field communication interface at a second position opposing the first position;
detect a change of orientation of the information processing apparatus; and
control the display to rotate contents displayed on the display based on the detected change of orientation without changing a position of the first graphic indication.

15. An information processing apparatus, comprising:
a housing having a first surface and a second surface;
a display disposed on the first surface of the housing;
a near-field communication interface disposed at a first position on or beneath the second surface;

a processor configured to control the display to display a graphic indication corresponding to the near-field communication interface at a second position opposing the first position; and a communication interface that transmits an identification corresponding to the information processing apparatus to a server and receives information indicating the second position at which the graphic indication corresponding to the near-field communication interface is displayed.

* * * * *